US009106542B2

(12) United States Patent
Venkateshwaran et al.

(10) Patent No.: US 9,106,542 B2
(45) Date of Patent: Aug. 11, 2015

(54) SYSTEM AND METHOD FOR NETWORK TRAFFIC AGGREGATION AND ANALYSIS OF MOBILE DEVICES USING SOCKET WRAPPERS

(75) Inventors: Ramaswamy Venkateshwaran, Fremont, CA (US); David William Craig, San Diego, CA (US); Eugene V. Kolinko, San Diego, CA (US); Alexander Ivanov, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 284 days.

(21) Appl. No.: 13/594,663

(22) Filed: Aug. 24, 2012

(65) Prior Publication Data
US 2014/0059206 A1 Feb. 27, 2014

(51) Int. Cl.
*G06F 15/173* (2006.01)
*H04L 12/26* (2006.01)
*H04L 29/06* (2006.01)

(52) U.S. Cl.
CPC .......... *H04L 43/0894* (2013.01); *H04L 43/028* (2013.01); *H04L 43/0876* (2013.01); *H04L 43/0882* (2013.01); *H04L 69/162* (2013.01)

(58) Field of Classification Search
CPC ............ H04L 43/0876; H04L 43/0882; H04L 169/162
USPC ........................................................ 709/224
See application file for complete search history.

(56) References Cited

U.S. PATENT DOCUMENTS

| 7,424,489 | B1* | 9/2008 | Duffield et al. ........................ 1/1 |
| 7,783,750 | B1* | 8/2010 | Casey et al. .................... 709/224 |
| 7,979,528 | B2* | 7/2011 | Eisenberg et al. ............. 709/224 |
| 8,136,149 | B2* | 3/2012 | Freund ............................ 726/11 |
| 8,380,840 | B2* | 2/2013 | Vijay ............................. 709/224 |
| 8,555,295 | B2* | 10/2013 | Karino et al. .................. 719/328 |
| 2002/0124074 | A1* | 9/2002 | Levy et al. ..................... 709/224 |
| 2007/0076606 | A1* | 4/2007 | Olesinski et al. ............. 370/230 |
| 2009/0177567 | A1* | 7/2009 | McKerlich et al. ............. 705/35 |
| 2010/0132024 | A1* | 5/2010 | Ben-Natan et al. ............... 726/9 |
| 2011/0087779 | A1* | 4/2011 | Martin et al. ................. 709/224 |
| 2011/0137960 | A1* | 6/2011 | Price et al. .................... 707/812 |

(Continued)

OTHER PUBLICATIONS

"Network to Device Optimization," White Paper SEVEN Open Channel, Feb. 2011, pp. 15.

(Continued)

*Primary Examiner* — Lance L Barry
(74) *Attorney, Agent, or Firm* — Neugeboren O'Dowd PC

(57) ABSTRACT

This disclosure describes systems, methods, and apparatus for per-application network traffic monitoring by extending socket functionality to include socket wrappers able to identify network traffic volume, applications responsible for the traffic, the network being loaded, and distinguish between internal device traffic and external network traffic. Network traffic shaping can then be carried out by managing an offending application's traffic. A disclosed method includes loading a call intercept library prior to loading any core libraries of an operating system, calling a socket wrapper, calling a socket by way of functions of at least one of the core libraries, and receiving at least one data packet, from a responding application external to the communications device, at the socket. The method may also include trapping a call, to read the at least one data packet; and releasing the call to the socket so the data packet is read by the destination application.

23 Claims, 8 Drawing Sheets

(56) References Cited

U.S. PATENT DOCUMENTS

| | | | |
|---|---|---|---|
| 2012/0216063 A1* | 8/2012 | Ogata | 713/323 |
| 2013/0291086 A1* | 10/2013 | Pontillo et al. | 726/10 |
| 2014/0047535 A1* | 2/2014 | Parla et al. | 726/15 |
| 2014/0059206 A1* | 2/2014 | Venkateshwaran et al. | 709/224 |

OTHER PUBLICATIONS

Vandat, et al., "Scalability and Accuracy in a Large-Scale Network Emulator," SIGOPS Oper. Syst. Rev. 36, SI (Dec. 2002), pp. 271-284.

\* cited by examiner

SYSTEM AND METHOD FOR NETWORK TRAFFIC AGGREGATION AND ANALYSIS OF MOBILE DEVICES USING SOCKET WRAPPERS

FIELD OF THE DISCLOSURE

The present disclosure relates generally to wireless mobile devices. In particular, but not by way of limitation, the present disclosure relates to systems, methods and apparatuses for monitoring network traffic on a per-application and per-network basis.

BACKGROUND

The widespread use of smartphones and cell-based WIFI hotspots has led to an explosion in signaling and data traffic on cellular networks. One way to manage this explosion is to identify and address applications that overuse the data network. There are current solutions that monitor network usage on a per-device basis, but these solutions suffer from the challenge of correlating whole-device usage to single application usages.

While there are some solutions that can monitor per-application network loading at the network layer, the data includes traffic that is internal to the phone (e.g., application-to-application traffic). Thus, their measurements of network traffic are skewed upwards by the inclusion of internal-device traffic and can create false positives when identifying network-abusive applications. These solutions also suffer from an inability to distinguish between applications that are responsible for downloaded network traffic (incoming traffic).

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some aspects of the disclosure may be characterized as a communication apparatus for monitoring applications. The communication apparatus may comprise a network interface configured to receive a data packet from a network. The communication apparatus may further comprise a memory for storing a plurality of core libraries and a call intercept library. A further aspects of the communication apparatus can include a processor for running: a library load module configured to load the call intercept library and any of the plurality of core libraries, an application configured to read and process the data packet, a socket based in one of the plurality of core libraries, and a socket wrapper based in the call intercept library. The call intercept library can load before any of the plurality of core libraries. The socket can be configured to be called by the application using functionality of one of the plurality of core libraries after the network interface receives the data packet, and to receive the data packet from the network interface. The socket wrapper can be configured to trap a call from the application to the socket in order to read the data packet. The socket wrapper can also be configured to ascertain a number of bytes in the data packet. The socket wrap can further be configured to release the call to the socket so that the application can read the data packet. The communication apparatus can further include a call analyzer module configured to determine a network traffic load attributable to the application based at least on the number of bytes in the data packet.

In some aspects, the socket wrapper may identify the network interface through which the data packet arrived. The call analyzer module may further determine whether the data packet originated internally or externally to the communication apparatus. The call analyzer module may also be configured to identify the destination application.

Other aspects of the disclosure may also be characterized as a method of monitoring network-abusing applications via methods at an OS layer of a communication device. The method may comprise loading a call intercept library prior to loading any core libraries of the OS, and calling a socket wrapper by way of functions of the call intercept library. The method may also include calling a socket by way of functions of at least one of the core libraries, and receiving at least one data packet from a responding application external to the communication device, at the socket. The method may also include trapping a call, from a destination application of the communications device, to read the at least one data packet. The method may additionally include extracting a number of bytes from the at least one data packet and releasing the call to the socket so that the at least one data packet is read by the destination application.

In some aspects, the method further includes identifying a network interface through which the at least one data packet traveled. Other aspects include determining whether the at least one data packet originated internally or externally to the communications device. In other aspects, the method identifies the destination application for the one or more data packets.

Other aspects of the disclosure can be characterized as a non-transitory, tangible computer readable storage medium, encoded with processor readable instructions to perform a method for identifying network-abusing applications on a communication apparatus. The method can include loading a call intercept library prior to loading any core libraries of the OS, and calling a socket wrapper by way of functions of the call intercept library. The method may also include calling a socket by way of functions of at least one of the core libraries. The method may further include trapping a call, from an originating application, to transmit at least one data packet, and extracting a number of bytes from the at least one data packet. Finally the method may release the call to the socket so as to allow the socket to release the at least one data packet for transmission.

Still other aspects of the disclosure can be characterized as a communication apparatus for monitoring network-abusing applications. The communication apparatus can include the following: a means for loading a call intercept library prior to loading any core libraries of the OS; a means for calling a socket wrapper by way of functions of the call intercept library; a means for calling a socket by way of functions of at least one of the core libraries; a means for trapping a call, from an originating application, to transmit at least one data packet; a means for extracting a number of bytes from the at least one data packet; a means for releasing the call to the socket so as to allow the socket to release the at least one data packet for transmission to another socket of the communication apparatus; and a means for identifying network abusing applications based on at least the number of bytes.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

Figure 1:
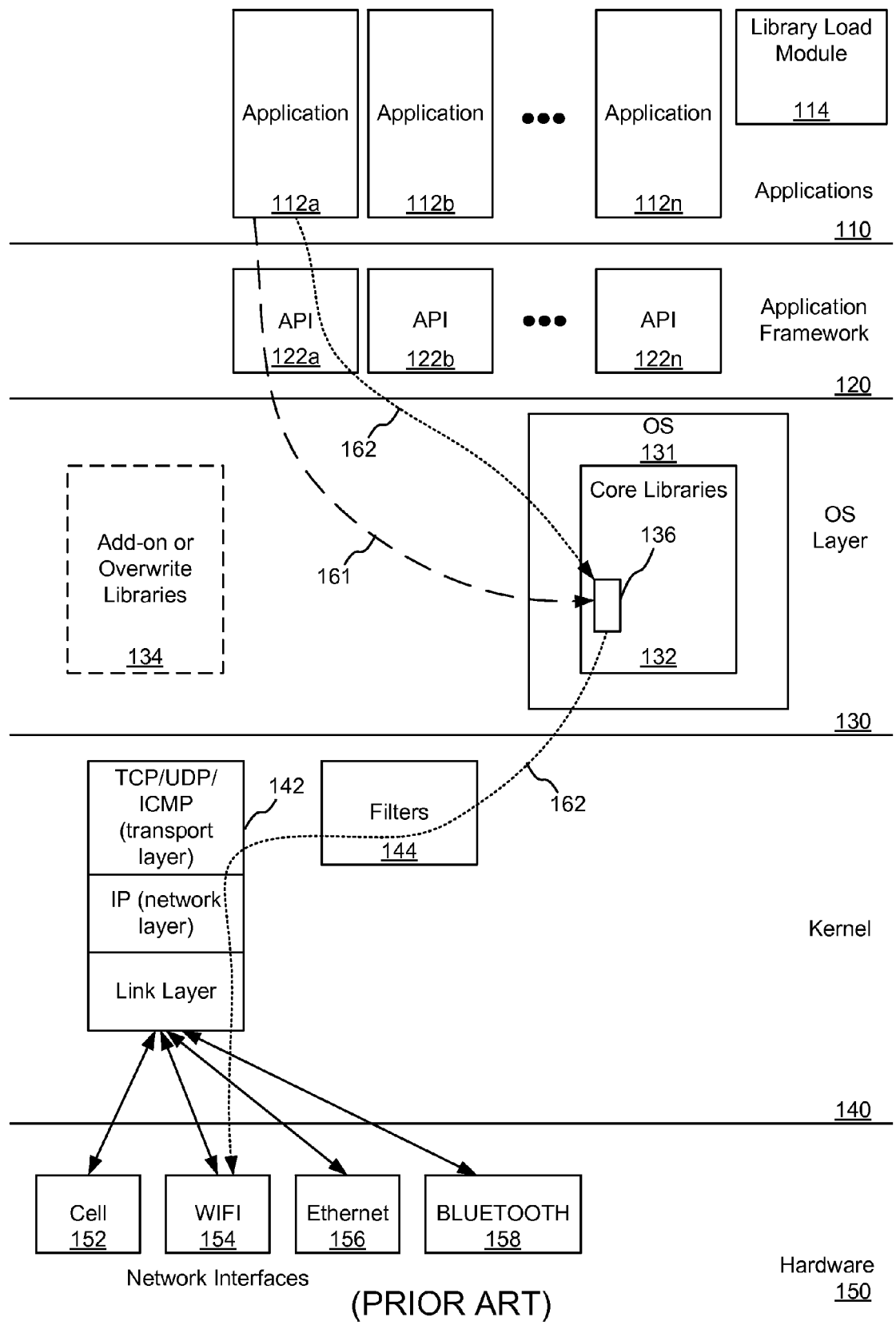
FIG. 1 illustrates an abstraction of a software stack and associated hardware layer monitoring outbound network traffic at a kernel layer.

The word "exemplary" is used herein to mean "serving as an example, instance, or illustration." Any embodiment described herein as "exemplary" is not necessarily to be construed as preferred or advantageous over other embodiments.

A communication channel (or "channel") can be a logical data connection that can be used to exchange data without storage of that data. A channel has two end points called sockets. Each socket is identified by an IP address (or a name in the case of local sockets), a family (e.g., Internet v4 or v6, a local domain, etc.), a port (or port number), and a transportation protocol (e.g., Transmission Control Protocol (TCP) or User Datagram Protocol (UDP)). The IP address can include a local address and a remote address, where the local address can be used to identify the source of outgoing data packets or the destination of incoming data packets. The remote address can be used to identify the destination of outgoing packets or the source of incoming packets. As examples of port numbers, a news server typically is assigned port number 119, a POP server is assigned port number 110, and an SMTP server is assigned port number 25. A socket typically enables communications between devices, but a pair of sockets can also enable communications between applications on the same device. Sockets distribute data packets to the correct application as those packets arrive through a channel.

The following discussion often discusses a pair of devices in communication with each other. In most situations where a first device communicates with a second device, one of the two devices initiates the communication and the other device responds to an initiation action. As such, devices that communicate with each other in this disclosure will be described in terms of an initiating device and a responding device. It will be recognized that either device can be the initiating or responding device and that these roles can switch over time. In some cases, the initiating device may be a client and the responding device may be a host in a client-host relationship. For instance, a user device such as a smartphone can be the client (initiating device) and a remote web server can be the host (responding device). In others, the initiating device may be a peer device and the responding device may be a peer device, and these roles can switch depending on the circumstances. For instance, a user device such as a smartphone can be a first peer (initiating device) and another user device such as a tablet computer can be a second peer (responding device), or vice versa. These examples are illustrative only, and one of skill in the art will recognize that other variations of initiating and responding devices are also possible. In some cases, communication may be one way and thus the responding device can be replaced by a "receiving device" (e.g., where a server initiates an unrequested download to a client). As such, the responding devices described herein can be considered synonymous with receiving devices.

In some embodiments, this disclosure is related to monitoring network usage for a mobile computing device, such as a smartphone, tablet computer, or ultrabook. In particular, some embodiments describe systems, methods, and apparatus for monitoring network traffic on a per-application basis and with identification of the networks that a given application is using (e.g., Ethernet, WIFI, cellular, 3G, 4G, etc.). This enables identification of applications that put the greatest burden on a network, the network being burdened by certain applications, and the degree of the burden. Accurate identifications are also made since some embodiments of this disclosure distinguish internal device traffic from network traffic thus avoiding false positives which would otherwise cause overestimates of network traffic.

Current solutions have tried to work within a typical framework as illustrated by the FIG. 1 abstraction of a software stack and associated hardware layer 150 (e.g., the ANDROID stack). The stack includes an applications layer 110 having a plurality of applications 112a, 112b, . . . , 112n and a library load module 114, an application framework layer 120 having a plurality of application programming interfaces (API's) 122a, 122b, . . . , 122n, an operating system (OS) layer 130 including core libraries 132 and add-on or overwrite libraries 134, and a kernel layer 140 including a network stack 142, filters 144, and various driver modules 146 (e.g., display, keypad, camera, WIFI, memory, audio). The hardware layer 150 includes, among other components, a plurality of network interfaces 152, 154, 156, 158 (only four of many possible network interfaces are illustrated). It should be understood that the illustrated software stack illustrated in FIG. 1 as well as those illustrated in FIGS. 2-5 are not limited to the layers and features that are illustrated, as some layers and features may not be illustrated or described in order to simplify this disclosure. For instance, driver modules, a common feature of the kernel layer 140, are not illustrated or discussed.

When an application, such as an originating application 112a, seeks to communicate with a remote application on a responding device (not illustrated) (e.g., a website on a remote web server), the originating application 112a makes a call 161 to the OS 131 to "send" one or more data packets 162. In other words, the application calls the socket 136, and the socket 136 is created via functionality of the core libraries 132, where the core libraries 132 describe programming methods including those for creating and using sockets. A set of network interface selection rules or a routing table determines which of a plurality of network interfaces 152, 154, 156, 158 will be used to establish the communication to the remote application. For instance, the set of network interface selection rules may determine that the socket 136 is to use the WIFI network interface 154.

The OS 131 assigns the socket 136, among other things, a local socket address (identifying the source of the communication by IP address and port number) and a remote socket address (identifying the destination of the communication by IP address and port number). Each network assigns an IP address to the corresponding network interface 152, 154, 156, 158, and the OS 131 can assign one of these IP addresses to the socket 136 once the OS 131 decides which network interface 152, 154, 156, 158 the socket 136 is to use (in this case the WIFI network interface 154). This IP address can be part of the local socket address, and identifies not only the socket 136, but also the network interface 152, 154, 156, 158 to be used for transmission of the one or more data packets 162. The OS 131 can assign the socket 136 an arbitrary port number selected from a list of available port numbers on the initiating device. The port number in conjunction with the IP address and possibly other parameters identifies the socket 136.

If a transport protocol for the socket 136 is TCP, then data packets are streamed and the OS 131 can assign the local socket address when a connection with the responding device is established. If the transport protocol is UDP, then datagrams are sent to the responding device, and the OS 131 can assign the local socket address to the socket 136 when the first datagram is sent.

The socket 136 can also be assigned a remote socket address including an IP address of the responding device and a port number for an application running on the responding device. The remote socket address may be extracted from a memory of the initiating device, or in the alternative, a DNS query can be performed to retrieve an IP address and port number.

Once a connection has been made in TCP, the responding device can send data packets back to the socket 136 using the local socket address appended to one or more data packets to direct responses back to the initiating device. In the case of UDP, the responding device can extract the local socket address from the one or more data packets 162 and use the local socket address to respond to the socket 136.

While data packets pass from the socket 136 to the responding device, filters 144 can measure a number of bytes in the one or more data packets 162. Via the filters 144 of the kernel layer 140, the OS 131 also monitors metadata associated with the socket 136 including a process ID of the process that owns the socket 136 and a socket descriptor assigned to the socket 136. When the one or more data packets 162 are accessed by the filters 144, the filters 144 access the metadata using the socket descriptor as a key to lookup the data. In this fashion, the filters 144 have access to the process ID and can therefore identify which application 112a, 112b, . . . , 112n sent the one or more data packets 162 (e.g., the originating application 112a). The filters 144 can also identify which network interface 152, 154, 156, 158 the one or more data packets 162 are traveling through (e.g., the WIFI network interface 154).

The local socket address includes an IP address which identifies which of the network interfaces 152, 154, 156, 158 is being used for the communication (e.g., the WIFI network interface 154). By identifying the amount of traffic associated with the socket 136 as well as which of the applications 112a, 112b, . . . , 112n is responsible for the traffic and which of the network interfaces 152, 154, 156, 158 is being used, applications 112a, 112b, . . . , 112n that excessively use the network for outbound traffic can be identified (hereinafter referred to as "network-abusing applications").

However, the filters 144 are not effective to identify network-abusing applications when traffic is inbound. Inbound traffic, or downloading, is the more common use of the network by an initiating device, and thus the more important for identifying network-abusing applications. The reason that the filters 144 are ineffective to determine network download traffic on a per-application basis is illustrated in FIG. 2.

Figure 2:
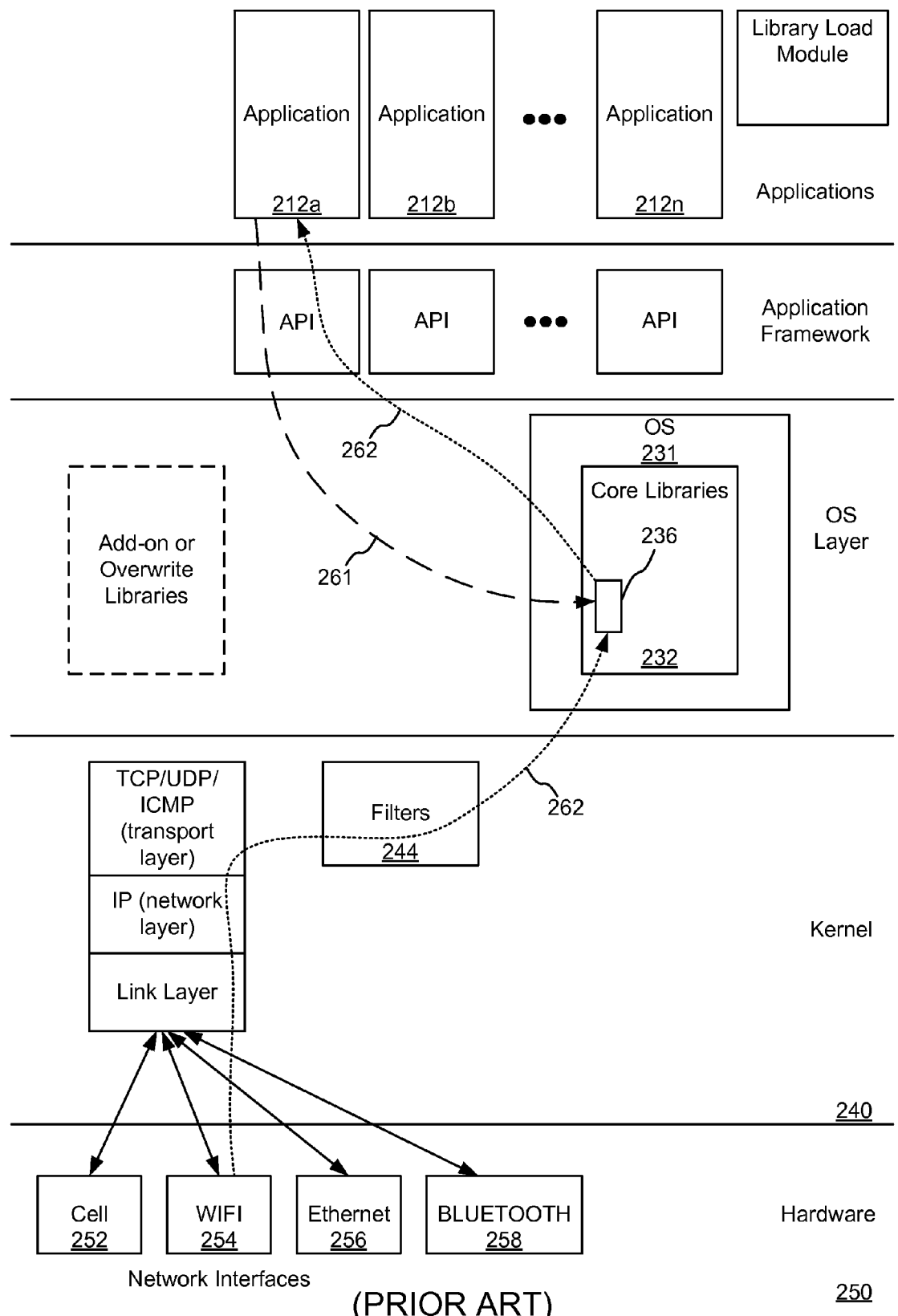
FIG. 2 illustrates an abstraction of a software stack and associated hardware layer monitoring inbound network traffic at a kernel layer.

FIG. 2 illustrates a software stack and associated hardware layer 250 receiving one or more inbound data packets 262 as commonly utilized in the art. Here, the responding device directs one or more inbound data packets 262 to the local socket address of the initiating device and an originating (or recipient) application 212a. For example, the local socket address can include an IP address and port number assigned to the socket 236. The socket 236 receives the one or more inbound data packets 262 from the responding device and makes these available to the originating application 212a in response to a "read" call 261.

The kernel layer 240 can include a mapping of the IP address and port number assigned to the socket 236 that identifies the originating 212a application. However, the IP address and port number do not indicate to the filters 244 which application is the originating application 212a. In this description the remote device sending the one or more inbound data packets 262 will be referred to as the responding device (e.g., where a remote web server responds to a client request), and the local device receiving the one or more inbound data packets 262 will be referred to as the initiating device (e.g., a client that made a request to a remote web server). However, one of skill in the art will recognize that the so-called responding device could also be an initiating device and the so-called initiating device could be a responding device or merely a receiving device.

Filters 244 can count a number of bytes in the one or more inbound packets 262 and identify which of a plurality of network interfaces 252, 254, 256, 258 is being used (e.g., the WIFI network interface 254). For instance, where the communication was established via the WIFI network interface 254, traffic from the responding device will enter the initiating device via the WIFI network interface 254. However, since the filters 244 exist in the kernel layer 240 and are processed by the kernel, they have access only to the metadata in the one or more inbound data packets 262, which only includes an IP address and port number of the socket 236, not the mapping that identifies the originating application 212a associated with the socket 236. In other words, the filters 244 do not have access to the process ID or user ID of the originating application 212a. The mapping is maintained in the OS 231 and is not easily accessible when the filters 244 are processed by the kernel. Filters 244 are thus ineffective at identifying network-abusing applications for inbound traffic (downloads).

To more accurately assess network traffic, and to do so on a per-application basis for both inbound and outbound traffic, this disclosure enables network traffic monitoring at an OS layer rather than by filters in a kernel layer. Various embodiments of such network traffic monitoring systems, methods, and apparatus are illustrated in FIGS. 3-6.

Figure 3:
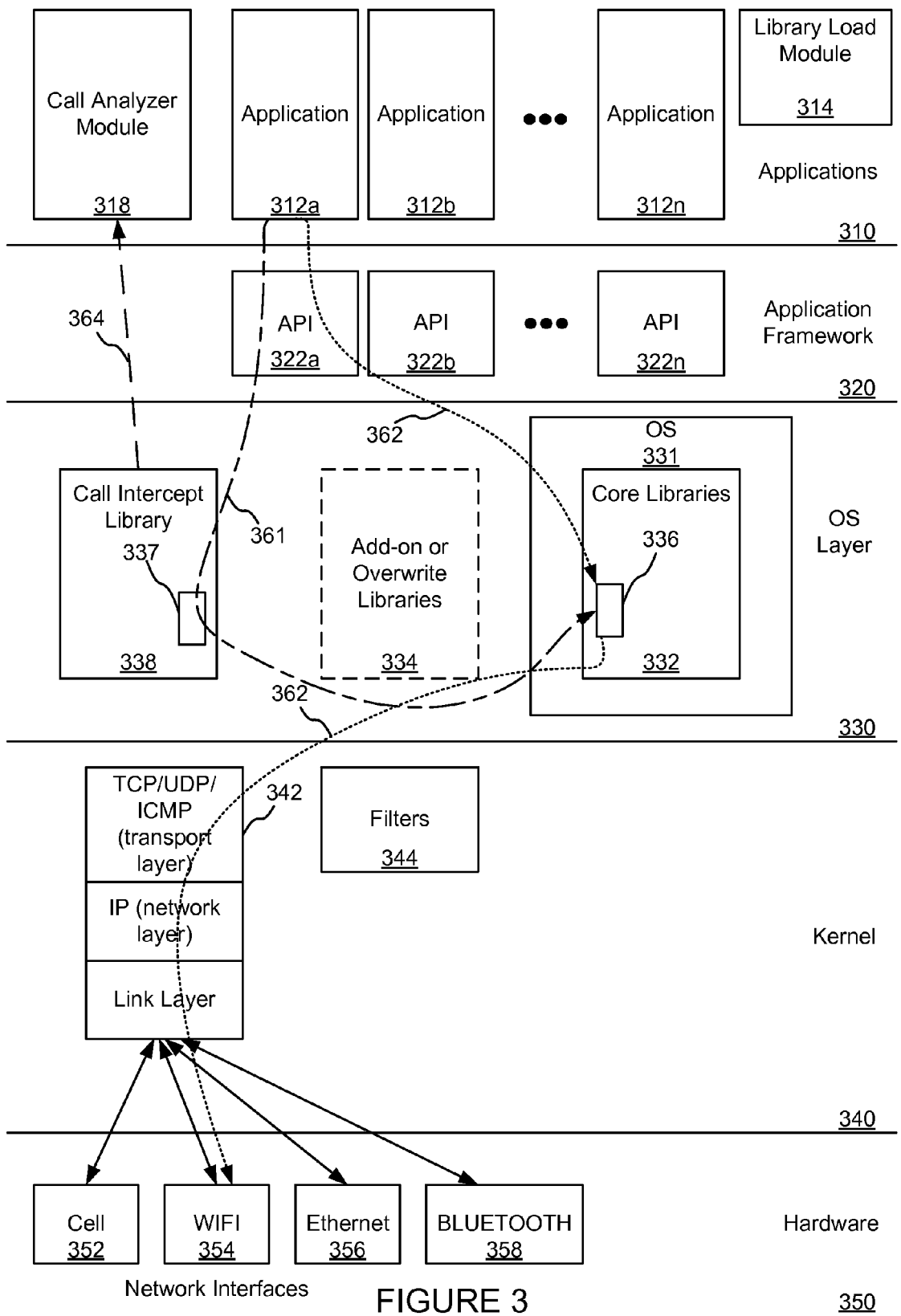
FIG. 3 illustrates an abstraction of a software stack and associated hardware layer configured to monitor outbound network traffic at an OS layer.

FIG. 3 illustrates one embodiment of a software stack and hardware layer 350 configured to monitor network traffic at an OS layer 330 rather than at a kernel layer 340. Traditionally, an originating application 312a (e.g., a web browser) makes a call 361 to the operating system (OS) 331, that, via functionality of core libraries 332, creates a socket 336 as a first endpoint of communication with a socket of a responding device (not illustrated), such as a web server hosting a webpage. However, the functionality of the socket 336 can be extended by functionality of a socket wrapper 337 as provided by a call intercept library 338. The call intercept library 338 can be scripted to load before the core libraries 332 such that the socket wrapper 337 traps the call 361 and analyzes the one or more data packets 362 at the socket 336. In one embodiment, a library load module 314 can load the call intercept library 338 and the core libraries 332 into a memory such that the call intercept library 338 is loaded first. The call 361 is released to the socket 336 and the one or more data packets 362 are passed to a network stack 342 of the kernel layer 340 for transmission. Despite the socket wrapper 337 trapping the call 361, in a preferred embodiment, the socket wrapper 337 has little or no impact on the user experience. For instance, there may be no noticeable delay, interruption, or other degradation to the user experience.

An applications layer 310 includes a plurality of applications 312a, 312b, . . . , 312n (where n is a positive integer representing a number of applications) along with a call analyzer module 318. The plurality of applications 312a, 312b, . . . , 312n are often written in Java and can include applications such as an e-mail client, an SMS program, a calendar, maps, a browser, contacts, a phone, and many others. The call analyzer module 318 uses information 364 provided by the call intercept library 338 to determine a number of bytes in each of the one or more data packets 362 as well as to identify the application sending/receiving each packet (e.g., 312a). The call analyzer module 318 can also determine which network interface 352, 354, 356, 358 is being (or will be) used to transmit each of the one or more data packets 362. Through this analysis, the call analyzer module 318 can identify network-abusing applications, and determine what, if any, actions to take to improve network usage (e.g., throttling network access for network-abusing applications).

The application framework layer 320 can include a plurality of application programming interfaces (APIs) 322a, 322b, . . . , 322n, at least one for each application in the plurality of applications 312a, 312b, . . . , 312n. The application framework layer 320 can act as an interface between the applications layer 310 and the OS layer 330. Each one of the plurality of applications 312a, 312b, . . . , 312n can have one or more corresponding APIs 322a, 322b, . . . , 322n used to interact with the OS layer 330. Developers can use previously developed APIs 322a, 322b, . . . , 322n, or components thereof, to construct new or modified APIs.

The OS layer 330 includes an OS 331 having core libraries 332 (e.g., System C, Media, Surface Manager, LibWebCore, SGL, 3D, FreeType, and SQLite, to name a few). Core libraries 332 can function to play audio files, render graphics, and enable web browsing, to name just a few exemplary functions. The functionality of these core libraries 332 can be extended or replaced via optional add-on or overwrite libraries 334 (e.g., a graphics library or phonebook library) created by applications developers ("developers") via the applications framework layer 320. The OS 331 can, in one embodiment, be an ANDROID operating system.

The originating application 312a can make a call 361 to transmit one or more data packets 362, and this call 361 can create the socket 336 via functionality of one or more of the plurality of core libraries 332. Along with creating the socket 336, functionality of one or more of the plurality of core libraries 332 assigns a source IP address to the socket 336, where the source IP address is the local IP address (generally not publicly routable) that a network assigned to the WIFI network interface 354 (or whichever network interface 352, 354, 356, 368 the OS 331 decides to send the one or more data packets 362 through). For instance, where it is determined that the one or more data packets 362 will traverse the WIFI network interface 354, the source IP address for the socket 336 can be the local IP address that the WIFI network assigned to the WIFI network interface 354. In some cases a public IP address can be assigned to one of the network interfaces 352, 354, 356, 358, such as when a cellular network operator assigns a public IP address to a device on its cellular interface.

The core libraries 332 can provide methods or functionality to generate at least one socket 336 when one of the applications 312a, 312b, . . . , 312n seeks to communicate with a responding device (not illustrated) or with another one of the applications 312a, 312b, . . . , 312n within the initiating device. When the originating application 312a (e.g., a social media web-based application), seeks to communicate with a responding device (e.g., a remote web server), and a remote application of the responding device (e.g., the social media website operating on the remote web server), the originating application 312a can make a call 361 to the OS 331 requesting transmission of the one or more data packets 362.

The socket wrapper 337 can trap the call 361 before the socket 336 passes the one or more data packets 362 to the network stack 342 and can analyze the one or more data packets 362 to obtain information related to one or more of the following: (1) a number of bytes per data packet; (2) which of the one or more applications 312a, 312b, . . . , 312n is the source of the one or more data packets 362 (via a user ID and/or process ID); (3) which network interface 352, 354, 356, 358 will be used to transmit the one or more data packets 362 (via the source IP address of the socket 336); and (4) whether the one or more data packets 362 are destined for a responding device or another application 312b, . . . 312n internal to the initiating device (via metadata indicating a type of socket address, type of socket, or socket family) (this situation is discussed further with reference to FIG. 5). This functionality is an extension of the core libraries 332 functionality that replaces the functionality of the socket 336 with that of a call intercept library 338.

When the one or more data packets 362 are passed from the originating application 312a to the socket 336, the OS 331 can switch contexts to that of the originating application 312a, which owns the socket 336—a context that the socket wrapper 337 also runs in. The socket wrapper 337 can trap a call 361 to the socket 336 to transmit the one or more data packets 362. Having trapped the call 361, and running in the context of the originating application 312a, the socket wrapper 337 can access metadata of the originating application 312a, which includes a process ID and/or user ID that identify the originating application 312a. In some cases, a database of the OS 331 can be used to lookup a name of the originating application 312a—the application that owns the context in which the socket 336 and socket wrapper 337 operate in—based on the process ID and/or user ID.

The OS 331 assigns a socket descriptor to the socket 336 when the socket 336 is created. The kernel maintains a mapping of the socket descriptor to socket metadata as well as methods enabling the socket wrapper 337 to query the kernel for the socket metadata thus giving the socket wrapper 337 access to information such as the socket descriptor, local and remote IP addresses, and socket family, to name a few.

The functionality of the socket wrapper 337 can be enabled by scripting the call intercept library 338 to have a priority in loading over the core libraries 332. In other words, the OS layer 330 can load the call intercept library 338 before it loads the core libraries 332, thus enabling the socket wrapper 337 to trap the call 361 and analyze the one or more data packets 362 before the socket 336 passes them to the network stack 342. This priority in loading can be carried out via the library load module 314.

The socket wrapper 337 can provide the aforementioned information 364 (including the socket and application metadata) to the call analyzer module 318, which can use this information to identify network-abusing applications and do so with increased accuracy since internal traffic is not counted as network traffic. In particular, the call analyzer module 318 can determine a number of bytes in each one of the one or more data packets 362. It can also determine which network interface (e.g., WIFI network interface 354) the one or more data packets 362 are traversing by looking at the source IP address of the socket 336. Recall that this is because the source IP address of the socket 336 is also the IP address of the network interface 352, 354, 356, 358 used to transmit the one or more data packets 362 (e.g., WIFI network interface 354).

The call analyzer module 318 can also use the information 364 to identify the originating application 312a via the process ID and/or user ID associated with the originating application 312a. The socket wrapper 337 has access to the process ID and/or the user ID since it is created in the context of the originating application 312a. In comparison, filters 344 are not created in the context of the originating application and therefore do not have access to the process ID and user ID of the originating application 312a. A database of the OS 331 can be used to lookup a name of the originating application 312a based on the process ID and/or user ID provided to the call analyzer module 318 by the socket wrapper 337. The call analyzer module 318 can distinguish internal versus external traffic based on the family or type (or style) of socket 336, which, in one embodiment, can be extracted from metadata of the socket 336. With this information, the call analyzer module 318, can determine if the originating application 312a is generating high network traffic loads and what networks the originating application 312a is burdening.

Once the call 361 is released from the socket wrapper 337 and reaches the OS 331, the socket 336 establishes communication with the responding device (in TCP) or begins transmitting datagrams (in UDP) to the responding device. The one or more data packets 362 can pass through the network stack 342 of the kernel layer 340, where the network stack 342 provides a software interface between the software stack and the network interfaces 352, 354, 356, 358 in hardware. The network stack 342 can include, but is not limited to, network protocols such as TCP and UDP, an internet protocol (IP) or network layer, and a link layer. The kernel layer 340 also acts as an abstraction layer between the hardware layer 350 and the rest of the software stack.

The one or more data packets 362 can exit the software stack and pass through one of the network interfaces 352, 354, 356, 358 of the hardware layer 350 en route to the responding device. In this particular example, the one or more data packets 362 are traversing the WIFI network interface 354 to reach the responding device, but in other embodiments, the cellular network interface 352, Ethernet network interface 356, or BLUETOOTH network interface 358 could also be traversed. The cellular network interface 352 and WIFI network interface 354 are often used for client-host type communications, while the Ethernet network interface 356 is often used for client-host or peer-to-peer communications. The BLUETOOTH network interface 358 is often used for peer-to-peer communications. However, these types of communications are not limiting, nor do the network interfaces 352, 354, 356, 358 make up an exclusive list of those that can be implemented.

As seen, the call intercept library 338, the socket wrapper 337, and the call analyzer module 318, do not influence the call 361, the socket 336, or the transmission of the one or more data packets 362. In other words, trapping the call 361 and analyzing the information 364 before transmission is performed such that the user experience is not degraded. However, if the call analyzer module 318 identifies a network-abusive application and determines to take action regarding the same, then there are embodiments where various aspects of the software stack may be influenced, shut down, curtailed, or otherwise modified.

While current devices typically do not enable two networks to be used simultaneously (e.g., WIFI and 4G or UMTS and CDMA), products in development do have such functionality. For instance, transmission of a stream of data packets may be distributed between two or more networks (e.g., 3G and 4G cellular networks).

Figure 4:
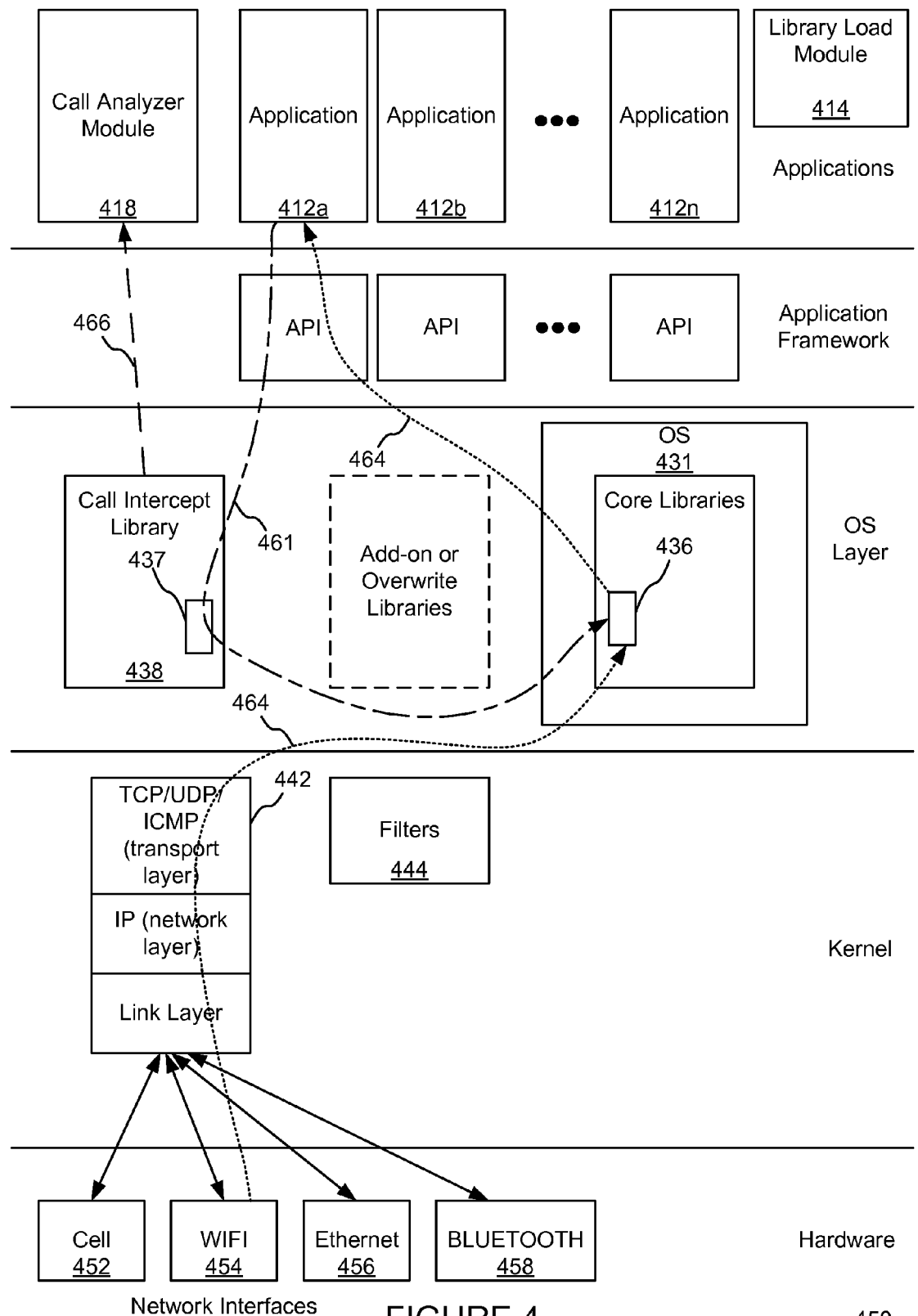
FIG. 4 illustrates an abstraction of a software stack and associated hardware layer configured to monitor inbound network traffic at an OS layer.

For inbound traffic (e.g., downloads), FIG. 4 illustrates one embodiment of a software stack configured to identify network-abusing applications. Traditionally, one or more inbound data packets 464 destined for a destination application 412a are received at one of a plurality of network interfaces 452, 454, 456, 458 (e.g., the WIFI network interface 454 in the illustrated embodiment), and enter the software stack via a network stack 442. The one or more data packets 464 queue at a socket 436 created by an OS 431, and are read by the destination application 412a in response to a "read" call (not illustrated) made by the destination application 412a and received at the socket 436.

However, here, the first socket 436 functionality is replaced by a custom function in the form of an at least one socket wrapper 437 of a call intercept library 438. When the destination application 412a makes a call 461 to read the first socket 436, the call is trapped by the socket wrapper 437 allowing the socket wrapper 437 to analyze the one or more data packets 464 at the first socket 436 before they are read by the destination application 412a. When finished, the socket wrapper 437 releases the call 461 thus enabling the destination application 412a to read the one or more data packets 464 from the socket 436.

Analyzing the one or more data packets 464 at the socket 436 can include obtaining information related to one or more of the following: (1) a number of bytes per data packet; (2) which of the one or more applications 412a, 412b, . . . , 412n the one or more data packets 462 destined for (via a user ID and/or process ID); (3) which network interface 452, 454, 456, 458 was used to receive the one or more data packets 464 (via the source IP address of the socket 436); and (4) whether the one or more data packets 464 are inbound from a responding device or from another application 412b, . . . 412n internal to the initiating device (via metadata indicating a socket address, type of socket, or socket family) (this situation is discussed further with reference to FIG. 5).

When the one or more inbound data packets 464 are inbound to the socket 436, the OS 431 can switch contexts to that of the destination application 412a, which owns the socket 436—a context that the socket wrapper 437 also runs in. The socket wrapper 437 can trap a call 461 to read the socket 436. Having trapped the call 461, and running in the context of the destination application 412a, the socket wrapper 437 can access metadata of the destination application 412a, which includes a process ID and/or user ID that identify the destination application 412a. In some cases, a database of the OS 431 can be used to lookup a name of the destination application 412a—the application that owns the context in which the socket 436 and socket wrapper 437 operate in—based on the process ID and/or user ID. The filters 444, in contrast, are not created in the context of the destination application 412a and therefore do not have access to the destination application 412a metadata and the included process ID and/or user ID.

The OS 431 assigns a socket descriptor to the socket 436 when the socket 436 is created. The kernel maintains a mapping of the socket descriptor to socket metadata as well as methods enabling the socket wrapper 437 to query the kernel for the socket metadata thus giving the socket wrapper 437 access to information such as the socket descriptor, local and remote IP addresses, and socket family, to name a few.

The at least one socket wrapper 437 can provide this information 466 (including the socket and application metadata) to a call analyzer module 418, which can identify network-abusing applications and do so with increased accuracy. In particular, the call analyzer module 418 can identify a number of bytes in each one of the one or more data packets 464. It can also determine which network interface (e.g., WIFI network interface 454) the one or more data packets 464 are traversing by looking at the destination IP address of the one or more data packets 464. The destination IP address is the local IP address (generally not publicly routable) that the network (e.g., WIFI) assigned to the network interface (e.g., WIFI network interface 454) traversed by the one or more data packets 464. In one embodiment, the call analyzer module 418 can use the source IP address of the one or more data packets 464 to identify the remote device that sent the one or more data packets 464 in case the remote device is blacklisted or otherwise an undesirable source.

Internal versus external traffic can be distinguished based on the socket 436 family or type. For instance, the call analyzer module 418 can extract the socket type from metadata of the socket 436 to determine whether the socket 436 is an endpoint for internal or external communications.

With this information, the call analyzer module 418, can determine if the destination application 412a is downloading excessive volumes of data and can determine what networks the destination application 412a is burdening. As in the case of outbound traffic, the call analyzer module 418 can again ignore internal traffic thus providing more accurate monitoring of network usage on a per application basis.

Figure 5:
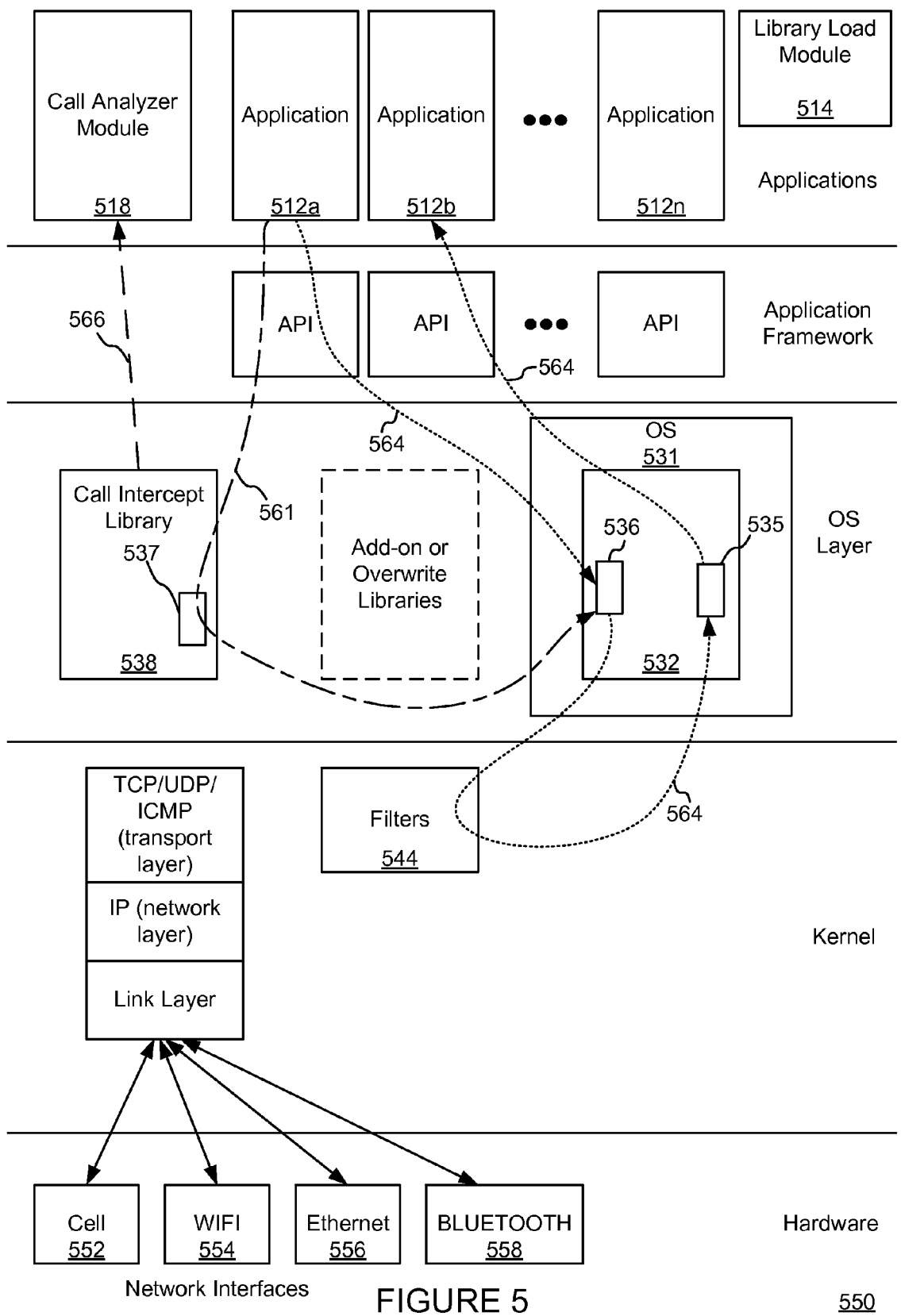
FIG. 5 illustrates an embodiment of a software stack and associated hardware layer configured to monitor internal device traffic at an OS layer.

While FIGS. 3-5 have discussed the situations of inbound and outbound traffic independently, it will be understood that the call analyzer modules 318, 418 are configured to identify network-abusive applications based on analysis of inbound and outbound traffic.

FIG. 5 illustrates an embodiment of a software stack where one or more data packets are being passed between applications on the same device. Here, a call 561 is made to an OS 531. Before a function of the core libraries 532 for creating a first socket 536 can run, a call intercept library 538 creates a socket wrapper 537 that traps the call 561 and analyzes the call 561 before the one or more data packets are passed to a second socket 535. In one embodiment, this occurs because a library load module 514 loads the call intercept library 538 before loading the core libraries 537. The socket wrapper 537 can extract information describing the following from the one or more data packets 564: (1) a number of bytes per data packet; (2) which of the one or more applications 512a, 512b, . . . , 512n is the source of the one or more data packets 564 (via a user ID and/or process ID); (3) whether the one or more data packets 564 are destined for a responding device or another application 512b, . . . 512n internal to the initiating device (via socket metadata indicating a type of socket address, type of socket, or socket family). This functionality of the socket wrapper 537 is an extension of the core libraries' 532 functionality that replaces the functionality of the first socket 536 with that of the call intercept library 538.

The socket wrapper 537 can provide this information 566 to a call analyzer module 518, which can determine that the one or more data packets 564 are not relevant to identifying network-abusive applications since the one or more data packets 564 are internally-directed. In particular, the call analyzer module 518 can determine from the type of socket address, type of socket, or socket family that the one or more data packets 564 are destined for another application of the initiating device or another socket (e.g., second socket 535) of the initiating device rather than a responding device, and therefore these one or more data packets 564 can be ignored when counting bytes for identification of network-abusing applications.

Once the socket wrapper 537 has trapped the call 561 and extracted the above-noted information, the call 561 is allowed to reach the OS 531, and the call 561 creates the first socket 536. The first socket 536 then transmits the one or more data packets 564 to the second socket 535 via the filters 544.

In one embodiment (not illustrated), the one or more data packets 564 can be routed through the socket wrapper 537 en route to the other application 512b from the second socket 535. In such an embodiment, the socket wrapper 537 can analyze the data packets 564 before they reach the first socket 536. This is one way that the socket wrapper 537 can differentiate local versus outbound/inbound traffic and thereby only pass information to the call analyzer module 518 regarding outbound/inbound traffic.

Figure 6:
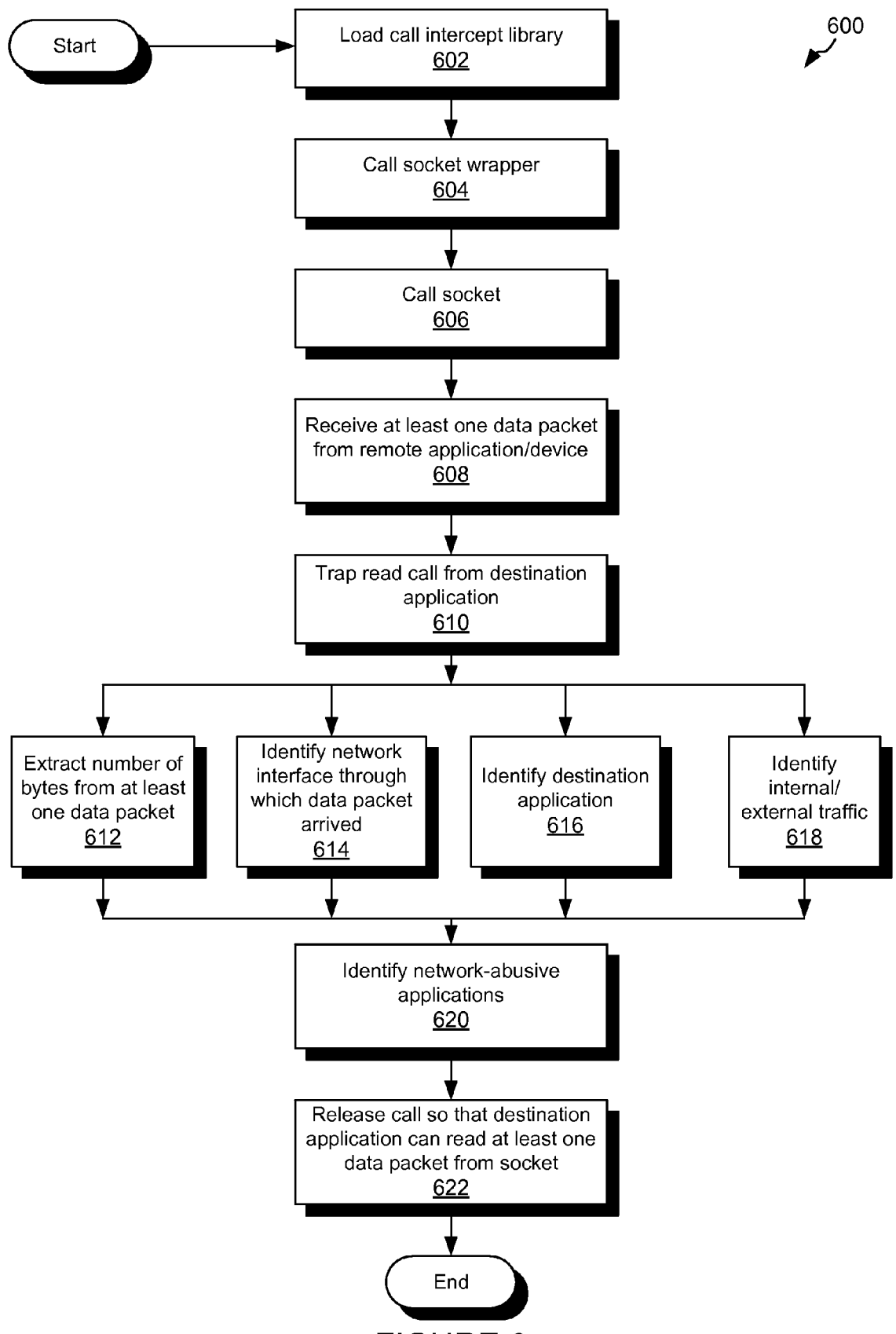
FIG. 6 illustrates a method for identifying network-abusive applications.

FIG. 6 illustrates a method 600 for identifying network-abusive applications. The method 600 begins with loading a call intercept library 602 such as the call intercept libraries 338 and 438 illustrated in FIGS. 3 and 4 via the library load modules 314 and 414. While there may be a plurality of core libraries belonging to the OS, the call intercept library can be configured to load before any of the core libraries. In the alternative, a library load module can be configured to load the call intercept library before any of the core libraries. A socket wrapper, such as socket wrappers 337 and 437 in FIGS. 3 and 4, can then be called 604 by way of functions of the call intercept library. A socket can also be called 606 by way of functions of the at least one of the core libraries (e.g., sockets 336 and 436 in FIGS. 3 and 4). At least one data packet can be received from a remote (responding) application or device 608. Once received, the destination application (e.g., 412a) may make a call (e.g., 464) to the socket to read the data packet (e.g., 464). This call can be trapped by the socket wrapper 610 and information about the transmission garnered from metadata of the socket and metadata of the destination application.

A number of bytes in the data packet can be extracted 612 while the network interface (e.g., 454) through which the data packet arrived can also be identified 614. The destination application can be identified 616 as well as identification as to whether the data packet is external or internal traffic (originating from another application within the same device such as is illustrated in FIG. 5) 618. With the number of bytes from the data packet, and optionally other information extracted from the data packet and the socket, a network-abusing application can be identified 620. Once such identification has taken place, or at the same time, or even before the identification but after the trapping of the call 610, the socket wrapper can release the call 622 so that the destination application can read the data packet.

Identifying the network interface through which the at least one data packet traveled 614 can involve identification via an IP address in metadata of the socket. Identifying the destination application 616 can look at metadata associated with the destination application in whose context the socket wrapper runs. This metadata may include a process ID or user ID that can be mapped to the destination application. Access to this metadata is only available to operations at the OS level (e.g., the socket wrapper 437 in FIG. 4), and in particular to those operations running in the context of the destination application. Such access is unique to operations running at the OS level for incoming data packets, and thus the identify operation 614 cannot be performed by filters operating at the kernel level (e.g., filters 444). Furthermore, the socket wrapper can look at a type or family of the socket as recorded in metadata of the socket to determine whether the data packet is part of internal or external traffic 618.

Data extracted from the one or more data packets can be passed to a call analyzer module (e.g., 418) for analysis and identification of network-abusive applications 620. The number of bytes, the network interface through which the data packet traveled (or an IP address corresponding to the network interface), the destination application (or a process ID corresponding to the destination application), and the type or family of the socket, can all be passed to the call analyzer module in support of the identification 620.

Figure 7:
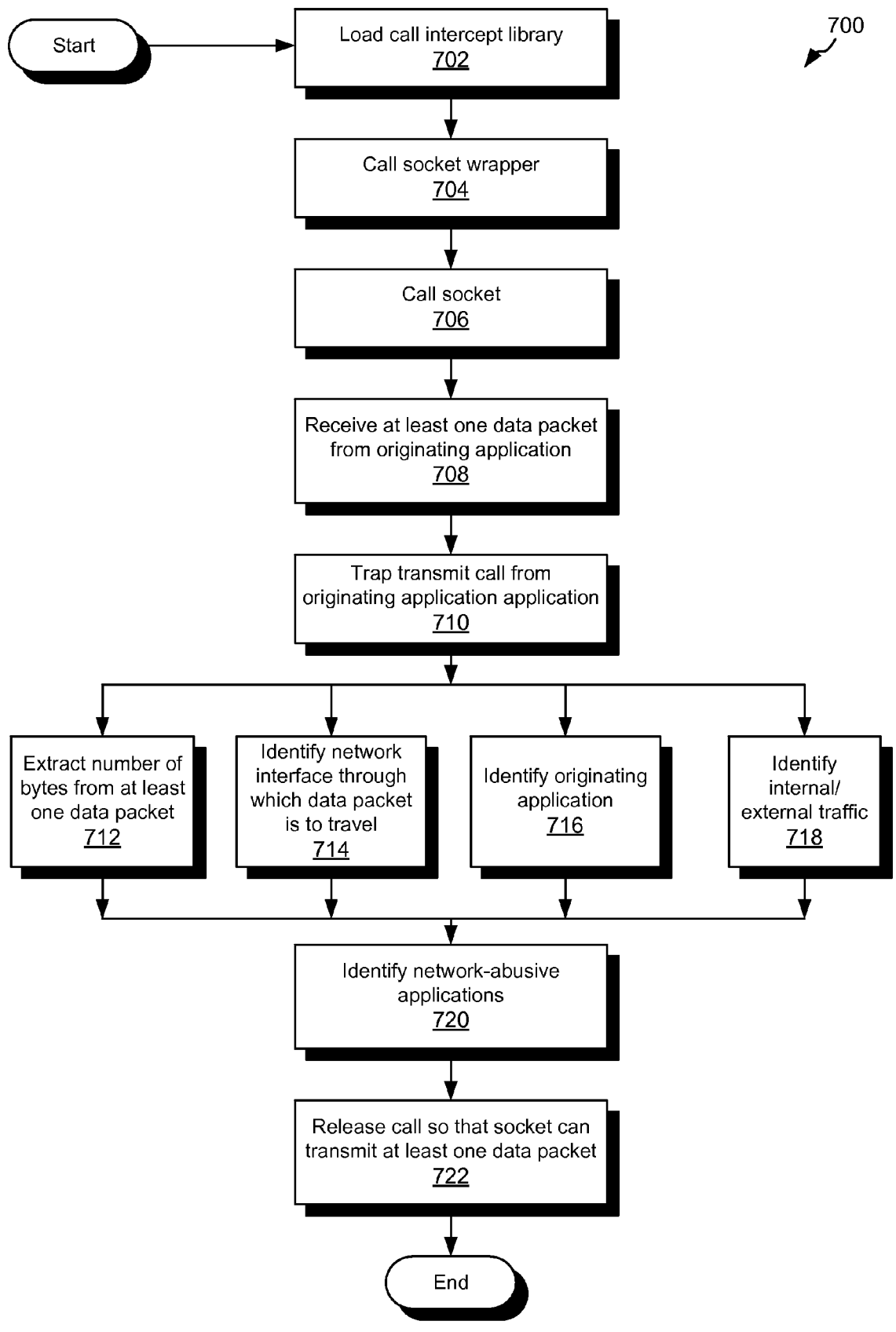
FIG. 7 illustrates a method for identifying network-abusive applications.

FIG. 7 illustrates a method 700 for identifying network-abusive applications. The method 700 begins with loading a call intercept library 702. While there may be a plurality of core libraries belonging to the OS, the call intercept library can be configured to load before any of the core libraries, or a library load module can be configured to load the call intercept library before it loads any of the core libraries. A socket wrapper, such as socket wrapper 337 in FIG. 3, can then be called 704 by way of functions of the call intercept library. A socket can also be called 706 by way of functions of the at least one of the core libraries. At least one data packet can be received from an originating application 708 (e.g., originating application 312a) and the originating application can make a call to transmit the data packet. This call can be trapped by the socket wrapper 710 and information about the transmission garnered from metadata of the socket and metadata of the destination application.

A number of bytes in the data packet can be extracted 712 while the network interface (e.g., 354) through which the data packet arrived can also be identified 714. The originating application can be identified 716 as well as identification as to whether the data packet is external or internal traffic (destined for another application within the same device such as is illustrated in FIG. 5) 718. With the number of bytes from the data packet, and optionally other information extracted from the data packet and the socket, a network-abusing application can be identified 720. Once such identification has taken place, or at the same time, or even before the identification but after the trapping of the call 710, the socket wrapper can release the call 722 so that the data packet can be transmitted.

Identifying the network interface through which the at least one data packet will travel 714 can involve identification via an IP address in metadata of the socket. Identifying the originating application 716 can look at metadata associated with the originating application in whose context the socket wrapper runs. This metadata may include a process ID or user ID that can be mapped to the originating application. Access to this metadata is only available to operations at the OS level, and in particular to those operations running in the context of the originating application. Such access is unique to operations running at the OS level for incoming data packets, and thus the identify operation 714 cannot be performed by the filters operating at the kernel level for incoming data packets. Furthermore, the socket wrapper can look at a type of family of the socket as recorded in metadata of the socket to determine whether the one or more data packets are part of internal or external traffic 718.

The order of operations illustrated in FIGS. 6 and 7 are illustrative only and not intended to limit the scope of various orders of operations that are envisioned. For instance, the identification of network-abusive applications 620 and 720 can be carried out before, after, or in parallel with the release of the call 622 and 722.

In any of the above-noted embodiments, once an application has been identified as a network-abusive application a variety of remedies can be carried out. The network-abusive application can have its communications redirected to a different network or split between multiple networks. The network-abusive application's communications can be throttled or limited. In some cases, only downloads or only uploads may be redirected to a different network or be throttled. In some cases, identification of network-abusive applications can be used by developers in order to modify applications to more efficiently or fairly use network bandwidth. These are just a few non-limiting examples of remedies for network-abusive application, and a variety of other remedies are also envisioned.

Figure 8:
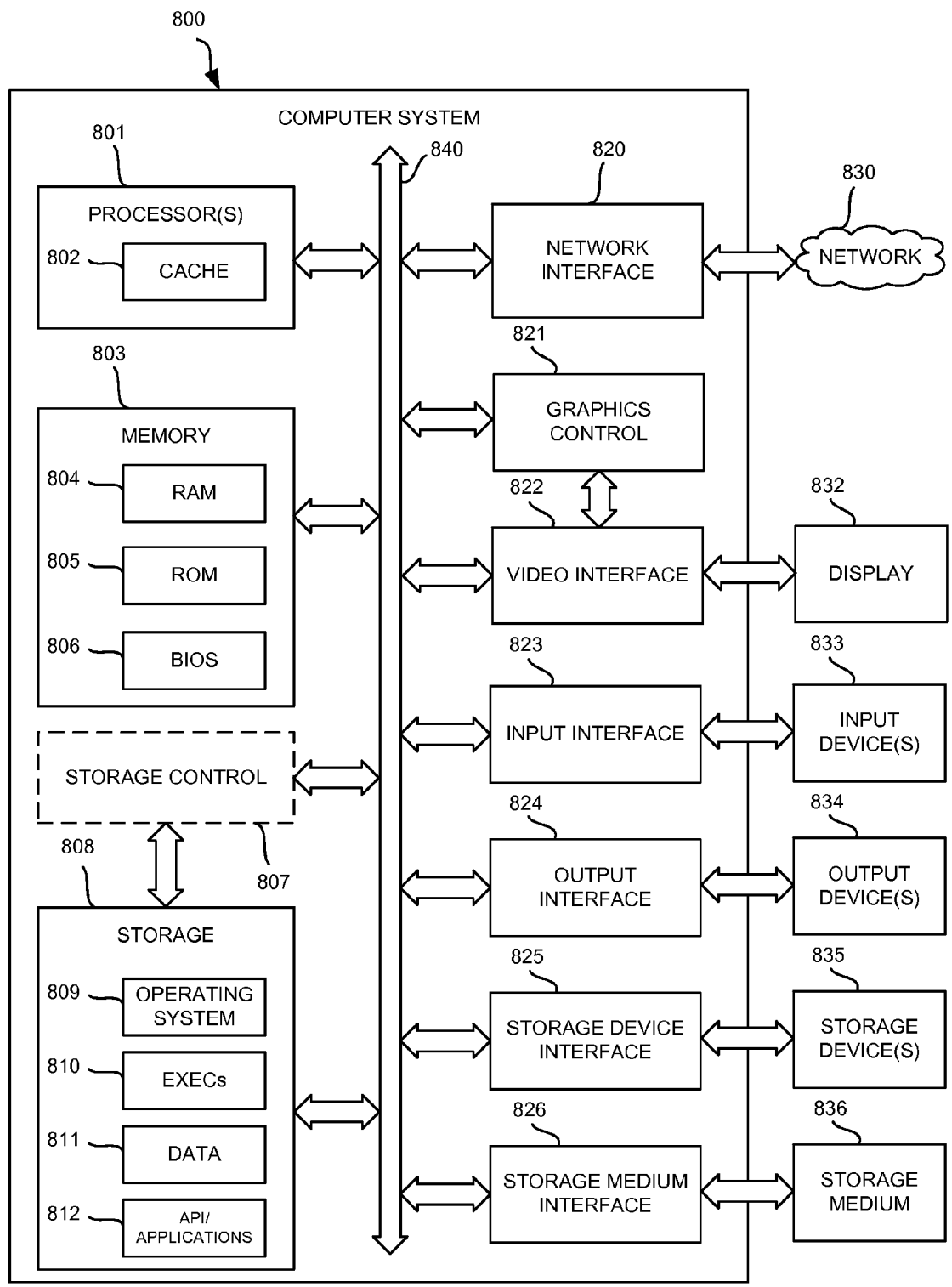
FIG. 8 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 8 shows a diagrammatic representation of one embodiment of a machine in the exemplary form of a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments. Exemplary computer systems 800 include, but are not limited to, desktop computers, laptop computers, netbooks, ultrabooks, PDAs, tablet computers, smartphones, media phones, and cellular phones.

Computer system 800 may include a processor 801, a memory 803, and a storage 808 that communicate with each other, and with other components, via a bus 840. The processor 801 may implement the functionality described in the methods of FIGS. 6-7. The processor 801 may also implement the functionality of the following applications: 312a, 312b, . . . , 312n; 412a, 412b, . . . , 412n; and 512a, 512b, . . . , 512n. The processor 801 may also implement the functionality of the call intercept libraries 338, 438, 538, and the socket wrappers 337, 437, 537. Furthermore, the functionality of the call analyzer module 318 can be embodied by the processor 801. The memory 803 or the storage 808 can store information that the socket wrappers 337, 437, 537 extract from the sockets 336, 436, 536 or from the one or more outbound data packets 362, inbound data packets 464, or data packets 564 that are routed to other applications within the device. Data describing the applications that the call analyzer modules 318, 418, 518 identify as network-abusing applications can also be stored in the memory 803 and/or storage 808. As another example, the call intercept library and the plurality of core libraries can be stored in the memory 803 and/or storage 808.

The bus 840 may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. In some embodiments, the tangible storage media 836 can embody and implement the methods described with reference to FIGS. 3-7.

The computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. For instance, examples of the computer system 800 include, but are not limited to, computer systems implementing the software stacks and hardware layers 350, 450, 550 illustrated in FIGS. 3-5. The initiating devices and receiving devices herein disclosed are further examples of the computer system 800.

Processor(s) 801 (or central processing unit(s) (CPU(s))) optionally contains a cache memory unit 802 for temporary local storage of instructions, data, or computer addresses. In one case, the processor(s) 801 can store in cache 802 a destination address of outbound data packets including a destination IP address and a destination port. Processor(s) 801 are configured to assist in execution of computer readable instructions. Computer system 800 may provide functionality as a result of the processor(s) 801 executing software embodied in one or more tangible computer-readable storage media, such as memory 803, storage 808, storage devices 835, and/or tangible storage media 836. The tangible computer-readable media may store software that implements particular embodiments, and processor(s) 801 may execute the software. In some embodiments, this software may carry out the functionality of the call intercept libraries 338, 438, 538 or that of the call analyzer modules 318, 418, 518. Memory 803 may read the software from one or more other computer-readable media (such as mass storage device(s) 835, 836) or from one or more other sources through a suitable interface, such as network interface 820. The network interface 820 may take the form of any of the various network interfaces described with reference to FIGS. 3-5 (e.g., a WIFI network interface 354). The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, EXECs 810 (executables), data 811, APV applications 812 (application programs), and the like. EXECs 810 and/or the APV applications 812 can be embodied by any one or more of applications 312a, 312b, ..., 312n; 412a, 412b, ..., 412n; and 512a, 512b, ..., 512n. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. For instance, a user may input a domain name or GOOGLE search into an input device 833 such as a keyboard. Alternatively, a web search may be performed via voice commands using an input device 833 such as a microphone. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices and enterprise systems, connected to network 830. For instance, an initiating device and a responding device can communicate via the network 830. Communications to and from computer system 800 may be sent through network interface 820 (e.g., network interfaces 352, 354, 356, 358, 452, 454, 456, 458, 552, 554, 556, 558). For example, network interface 820 may receive incoming communications (such as requests or responses from a responding device) in the form of one or more data packets (such as Internet Protocol (IP) packets) from network 830, and computer system 800 may store the incoming communications in memory 803 for processing. Computer system 800 may similarly store outgoing communications (such as requests or responses to other devices) in the form of one or more data packets in memory 803 and communicated to network 830 from network interface 820. Processor(s) 801 may access these communication packets stored in memory 803 for processing. For instance, the processor(s) 801 may analyze outbound data packets to identify a network interface that is to be traversed by the outbound data packets.

Examples of the network interface 820 include, but are not limited to, a network interface card, a modem, and any combination thereof. Examples of a network 830 or network segment 830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 830, may employ a wired and/or a wireless mode of communication including WIFI and cellular networks. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821. The display 832 can present rendered graphics and text generated by the one or more applications 312a, 312b, . . . , 312n; 412a, 412b, . . . , 412n; and 512a, 512b, . . . , 512n.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, firmware, or a combination thereof.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, firmware or combinations of these. To clearly illustrate this interchangeability of hardware and software, various illustrative components, blocks, modules, circuits, and steps have been described above generally in terms of their functionality. Whether such functionality is implemented as hardware, software, or firmware depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., FIGS. 6 and 7) may be embodied directly in hardware, in a software module executed by a processor, in a firmware module executed by a processor, or in a combination of these. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communication apparatus for monitoring applications, the communication apparatus comprising:
   a network interface configured to receive a data packet from a network;
   a memory for storing:
      a plurality of core libraries; and
      a call intercept library;
   a processor for running:
      a library load module configured to load the call intercept library and any of the plurality of core libraries, the call intercept library loaded before any of the plurality of core libraries that were loaded;
   an application configured to read and process the data packet;

a socket based in one of the plurality of core libraries, configured to be called by the application using functionality of one of the plurality of core libraries after the network interface receives the data packet, and to receive the data packet from the network interface;

a socket wrapper based in the call intercept library, configured to trap a call from the application to the socket in order to read the data packet, ascertain a number of bytes in the data packet, and release the call to the socket so that the application can read the data packet; and a call analyzer module configured to determine a network traffic load attributable to the application based at least on the number of bytes in the data packet.

2. The communication apparatus of claim 1, wherein the call analyzer module identifies the network interface through which the data packet arrived.

3. The communication apparatus of claim 2, wherein the socket wrapper extracts an IP address from the data packet and passes the IP address to the call analyzer module, where the call analyzer module uses the IP address to identify the network interface through which the data packet arrived.

4. The communication apparatus of claim 1, wherein the call analyzer module determines whether the data packet originated internally or externally to the communication apparatus.

5. The communication apparatus of claim 4, wherein the socket wrapper is configured to access a type or family of the socket and provide this type or family to the call analyzer module, wherein the call analyzer module uses the type or family of the socket to determine whether the data packet originated internally or externally to the communication apparatus.

6. The communication apparatus of claim 1, wherein the call analyzer module is configured to identify the destination application.

7. The communication apparatus of claim 6, wherein the destination application is identified from a process ID extracted from metadata associated with the application.

8. The communication apparatus of claim 7, wherein the socket wrapper runs in the context of the application.

9. The communication apparatus of claim 8, wherein the socket runs in the context of the application.

10. The communication apparatus of claim 7, further comprising mapping the process ID to the destination application via a mapping that is only available at the OS layer.

11. The communication apparatus of claim 1, wherein the call analyzer module is further configured to identify the application as a network-abusing application if the network traffic load exceeds a threshold.

12. A method of monitoring network-abusing applications via methods at an operating system (OS) layer of a communications device, the method comprising:

loading a call intercept library prior to loading any core libraries of the OS;

calling a socket wrapper by way of functions of the call intercept library;

calling a socket by way of functions of at least one of the core libraries;

receiving at least one data packet, from a responding application external to the communications device, at the socket;

trapping a call, from a destination application of the communications device, to read the at least one data packet;

counting a number of bytes from the at least one data packet; and releasing the call to the socket so that the at least one data packet is read by the destination application.

13. The method of claim 12, further comprising identifying a network interface through which the at least one data packet traveled.

14. The method of claim 13, wherein the network interface is identified via an IP address in metadata of the at least one data packet.

15. The method of claim 12, further comprising determining whether the at least one data packet originated internally or externally to the communications device.

16. The method of claim 15, wherein the determining looks at a type or family of the socket.

17. The method of claim 12, further comprising identifying the destination application from metadata associated with the destination application.

18. The method of claim 17, wherein the socket wrapper operates in a context of the destination application.

19. The method of claim 17, wherein the destination application is identified from a process ID extracted from metadata associated with the destination application.

20. The method of claim 19, further comprising mapping the process ID to the destination application via a mapping that is only available at the OS layer.

21. A non-transitory, tangible computer readable storage medium, encoded with processor readable instructions to perform a method for identifying network-abusing applications on a communication apparatus, the method comprising:

loading a call intercept library prior to loading any core libraries of an operating system (OS) of the communication apparatus;

calling a socket wrapper by way of functions of the call intercept library;

calling a socket by way of functions of at least one of the core libraries;

trapping a call, from an originating application, to transmit at least one data packet;

counting a number of bytes from the at least one data packet; and releasing the call to the socket so as to allow the socket to release the at least one data packet for transmission.

22. The non-transitory, tangible computer readable storage medium of claim 21, further comprising, passing the number of bytes to a call analyzer module configured to compare the number of bytes to a threshold and to identify network-abusive applications.

23. The non-transitory, tangible computer readable storage medium of claim 22, wherein to compare the number of bytes to a threshold involves comparing a cumulative number of bytes received by the call analyzer module and associated with the originating application.

* * * * *